Dec. 4, 1956     E. J. HALFORD     2,772,478
DENTAL PROPHYLACTIC AND HYGIENIC INSTRUMENT
Filed Dec. 16, 1954

EDWARD J. HALFORD
INVENTOR

HUEBNER, BEEHLER,
WORREL & HERZIG
ATTORNEYS
BY
Richard M. Worrel

United States Patent Office 2,772,478
Patented Dec. 4, 1956

2,772,478

DENTAL PROPHYLACTIC AND HYGIENIC INSTRUMENT

Edward J. Halford, Fresno, Calif.

Application December 16, 1954, Serial No. 475,743

8 Claims. (Cl. 32—50)

The present invention relates to prophylactic and hygienic equipment and more particularly to an instrument having utility in maintaining oral hygiene.

The importance of practicing oral hygiene has long been known. Dentists stress the need for thorough cleaning of teeth to prevent deterioration thereof and to maintain oral as well as general health. In addition, the public is warned constantly by various advertisements to try products and materials for preventing tooth decay, eliminating mouth odors and the like. Although the instrument as provided by the present invention is adaptable to a variety of uses, it is intended primarily as an aid to oral prophylactic treatment.

Many devices are known for the cleaning of teeth. Designed for personal use, for example, are the tooth brush, dental floss and the tooth pick. Each of these tools has utility for certain purposes but none is suitable for thorough cleaning of the teeth by removal of calcium deposits and other hard substances.

Oral prophylactic treatment, as generally understood, includes the thorough scaling, cleaning and polishing of the teeth and is generally administered by a dentist. The teeth must be scaled to remove salivary calculus, commonly known as tartar, subgingival calculus, surface stains, mucinous plaques, materia alba, and other surface accretions. The scaler normally employed by a dentist or dental technician is an elongated tool with a curved neck at one end providing a sharpened blade and having a handle at the opposite end. This type of tool is used in cleaning the lingual and facial surfaces of the teeth as well as subgingival areas. Also employed are separate tools having pointed tips which are required for cleaning the proximal and interproximal areas. The presently available instruments have not been completely satisfactory for thorough cleaning tooth surfaces by the general public primarily because of their awkward size and ineffective shape. The present invention makes available a thoroughly effective cleaning instrument well within the manipulating capabilities of the general public.

The cleaning of teeth is additionally complicated by having to use several instruments suited to particular cleaning requirements. For example, one tool is usually employed for tooth surfaces and another for proximal areas. This results in delay and inefficiency in the dentist's work since he must completely do all tooth surfaces and then go back over the same teeth to do the proximal areas or else he must continually change tools, first doing a surface, then a proximal area, another surface and so on. It is apparent that this is also very tiring on the patient. Therefore, a tool is needed which in itself is capable of accomplishing both of the foregoing cleaning functions and which is more compact, versatile and simpler to use.

Furthermore, tools of this nature have been completely useless for unskilled personal use. As a result, therefore, many people fail to give their teeth proper care because of inability to afford the necessary professional treatment.

Aside from use in the more thorough oral prophylactic treatment, the present invention offers decided advantages over the every day teeth cleaning methods. For example, dentists have long warned that wedging the point of compressible wooden tooth picks between the teeth should be avoided. Despite such warnings a problem frequently encountered is that of wooden tooth picks breaking off and lodging between the teeth and requiring professional aid to effect removal.

It is an object of this invention to provide improvements in dental hygienic instruments.

Another object is to provide an instrument for use in oral prophylactic treatment.

Another object is to provide an improved dental tool for use in the scaling of teeth to remove calcareous and other accretions therefrom.

Another object is to provide a dental instrument having dual cleaning functions which is conveniently adapted for use on both surfaces and proximal tooth areas and in both exposed and subgingival positions.

Another object is to provide a dental instrument capable of use by skilled and unskilled individuals for the purposes intended.

Another object is to provide a dental tool capable of performing the functions of a tooth pick in an improved manner but without the hazards incident thereto.

Other objects are to provide a dental instrument which is versatile, compact, light in weight, easily manipulatable, adapted to a variety of uses and to use by a variety of individuals, economical to manufacture, durable, and highly effective for its intended purposes.

These and other objects will become more fully apparent upon reference to the following description.

Figure 1:
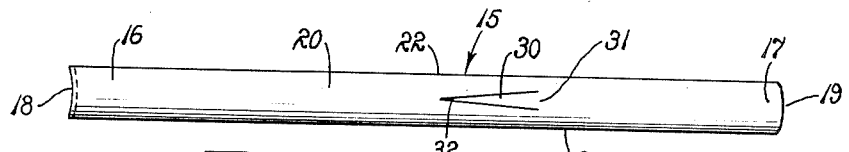
Fig. 1 is a top plan view of a blank as utilized in making the dental tool of the present invention.
Figure 3:
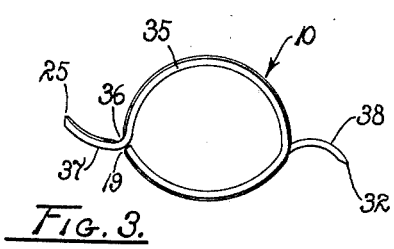
Fig. 3 is a side view of a dental tool made in accordance with the concept of the present invention, as formed from the blank of Fig. 1.
Figure 4:
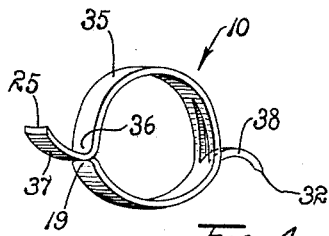
Fig. 4 is a perspective view of the dental tool shown in Fig. 3.
Figure 5:
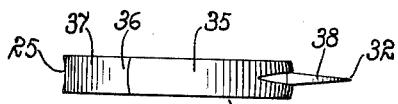
Fig. 5 is a view of the dental tool shown in Fig. 3 when viewed from the periphery thereof as seen looking downwardly in Fig. 3.

Referring more particularly to the drawing:

The tool or instrument 10 as provided by the present invention is best shown in Figs. 3 and 4. This instrument is excellently suited for use in oral prophylactic treatment and is conveniently described in connection therewith. It will be apparent as the description proceeds, however, that the instrument has utility in other respects.

Referring to Fig. 1, there is shown an elongated blank or band 15, of metal or other hard material, preferably having an arcuate cross section for imparting rigidity thereto. The blank provides opposite end portions 16 and 17 each having a transverse end edge 18 and 19, respectively. The blank further has an upper surface 20 and a lower surface 21. The blank also includes a pair of opposed longitudinal side edges 22.

Figure 2:
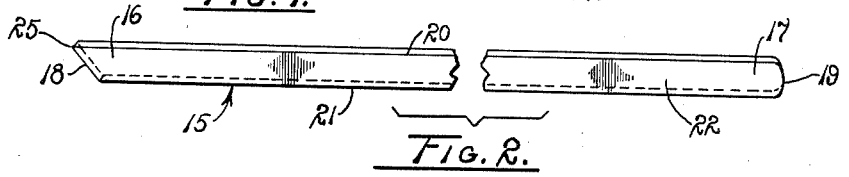
Fig. 2 is an enlarged side view of the blank shown in Fig. 1 having a central portion removed for more compact representation.

The transverse end edge 18 is beveled and is therefore slanted upwardly and endwardly from the lower surface 21 to the upper surface 20 of the blank 15 as viewed in Fig. 2. In addition, the end edge 18 is transversely concave, as seen in Fig. 1. The concave beveled surface meets with the upper surface of the blank in a sharpened knife edge 25 thereby providing a scraping blade. It is to be noted at this point that the concave or arcuate contour of the end edge 18 conforms substantially to the transverse curvature of a tooth whereby when the end edge is placed against the tooth it fits substantially flush thereagainst. It will be understood that other curvatures may be employed to correspond with the surface being cleaned, as desired. The opposite end edge 19 is conveniently of a shape complementary to the end edge 18 so that the devices can be successively cut from a continuous band or ribbon of blank material by single cutting action individual thereto. This end may be smoothed or dulled by filing or polishing.

A triangular portion 30 is stamped, struck, pierced or otherwise formed from the blank 15 intermediate the end portions 16 and 17. This cut-out portion provides a base 31 integrally attached to the blank and tapers toward a sharpened point 32.

In forming the tool 10, the end portion 16, having the scraping blade 25 thereon, is bent or curved slightly backwardly toward the upper surface 20 of the blank. The triangular cut-out portion 30 is pressed outwardly from the blank and is similarly curved in the same direction as the end portion 16.

Figure 6:
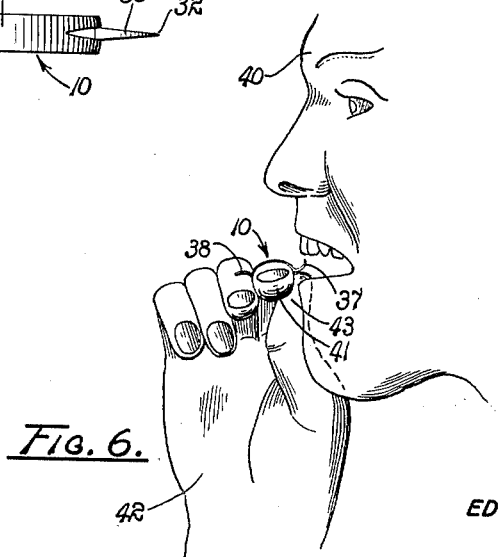
Fig. 6 is a side view of a person employing the dental tool provided by the present invention.

Further, the blank 15 is formed by rolling or other operation into a substantially annular body portion so that the upper and lower surfaces 20 and 21 of the blank constitute, respectively, the outer and inner surfaces of an annular member or ring 35. The end edge 19 of the blank when in annular form is positioned in adjacent spaced relation to the bend indicated at 36, between the bent end of portion 16 and the remainder of the blank, as clearly evident in Figs. 3 and 4. The inherent flexibility of the blank material permits diametric expansion of the ring for purposes of adjustability when fitted to various individuals. The bent end portion 16 forms a cleaning tool, hereinafter referred to as the hoe indicated at 37, and the bent triangular portion 30 also provides a cleaning tool, hereinafter referred to as the sickle, indicated at 38. This terminology is in accordance with accepted usage in the art. As shown in Figs. 3, 4 and 6, the hoe and the sickle are similarly outwardly arcuately extended from the ring and each provides a concave surface. The concave surfaces are disposed in the same direction circumferentially of the ring 35 so as to be engageable with the finger of the user's hand adjacent to that on which the ring is mounted.

Operation

The operation and use of the device of the invention is believed readily apparent and is briefly summarized at this point.

The tool 10 is adapted for manipulation either when positioned between the thumb and forefinger or when fitted on a finger or the thumb of the user.

Assuming it is to be used by an individual, shown at 40, for cleaning the teeth, the ring 35 of the tool 10 may be fitted on the forefinger 41 of the hand 42 of the user. For this purpose, the ring is made of a material which is expansible for various finger sizes. If the upper teeth are to be cleaned, the tool is slipped on the finger in such a manner that the hoe 37 is curved upwardly when facing toward the user. By then pressing the thumb 43 against the back of the hoe, the scraping blade 25 is brought into contact with the lingual surface of the tooth to be cleaned and firmly moved toward the biting edge. This action is repeated as often as necessary to remove surface accretions from the tooth being treated. The sickle or the scraping blade of the hoe may also be inserted in the subgingival areas to clean matter from beneath the gums.

To clean the proximal areas between the teeth, and assuming that the user is still cleaning the upper teeth, it is merely necessary to rotate the tool 10 on the finger through substantially 180° whereby the sickle 38 is facing the user and is upwardly curved. By then placing the pointed tip 32 of the sickle into the proximal areas, cleaning may be effected.

The tool 10 is shown and described on the forefinger 41 in the interest of clarity but it is to be understood that the expansibility of the ring 35 accommodates its use on any finger. Therefore, although the tool 10 is shown on the forefinger in Fig. 6, it is sometimes preferable, when the lingual surfaces of the lower teeth are to be cleaned, to position the tool on the thumb 43, a position not as clearly capable of illustration as that of Fig. 6. In this regard, it is to be noted that the lingual surfaces of the lower teeth are subject to considerably more surface accretion than the other teeth surfaces due to the location of the saliva glands in the mouth. To clean these surfaces, the tool 10 is positioned on the thumb and with the middle finger fulcrumed or braced on the chin, the hoe is placed in scraping engagement with the lingual surfaces of the lower teeth. A rocking motion is effected to drawing the hoe from the gums to the biting edges of the teeth with the middle finger resting on the chin acting as a guide.

As best seen in Fig. 6, although the blade 25 and point 30 are employed alternately, the hoe 37 and sickle 38 are employed cooperatively in a manner readily apparent. The ring 35 is rotatably received on the user's finger 41 to accommodate prompt and easy shifting of the instrument for selective use of the point and the blade. Being so rotatably mounted it cannot be fully effective unless temporarily held against rotation so that pressure can be exerted against the teeth. This is accomplished by coaction of the hoe and the sickle. Thus, as the hoe 37 is disposed for tooth engagement the sickle 38 overlies the finger adjacent to the finger on which the ring is mounted temporarily precluding rotation of the ring in a counterclockwise direction, as viewed. The hoe and the sickle each provide a concave surface for such engagement with the finger. Simultaneously, the user's thumb is braced against the hoe to preclude rotation of the ring in the opposite direction. For such thumb engagement, the blade and the sickle each provide a convex surface. To bring the sickle into operable position, the finger engaging the sickle is retracted, the ring rotated approximately 180°, the concave surface of the hoe brought to bear against the finger, and the thumb braced against the convex surface of the sickle. Whether the hoe or the sickle is being employed, the opposite thereof is cooperatively utilized in finger engagement to aid in the maintenance of the instrument in operable position.

From the foregoing, it will be readily apparent that the tool may be used for cleaning the facial, lingual and proximal surfaces of the upper and lower teeth merely by rotatably positioning the tool on the finger and that the tool is effective in cleaning beneath the gums. Alternatively, the tool may be fitted on the thumb or the other fingers or may be grasped between the thumb and finger. It is significant that a completely different type of cleaning action may be effected simply by turning or rotating the tool through substantially 180° thus obviating the need for a plurality of tools when cleaning teeth.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. An oral prophylactic instrument comprising a ring adapted for finger wear and rotatable positioning thereon, a tooth cleaning member of substantially uniform width outwardly extended from the ring having a scraping edge, and a tapered tooth cleaning member outwardly extended from the ring diametrically of the tooth cleaning member of uniform width and providing a cleaning point, the cleaning members each providing finger engaging surfaces disposed in the same direction circumferentially of the ring adapted for alternate finger engagement to restrain the ring against rotation.

2. A dental tool comprising an expansible annular member, a longitudinally arcuate tooth cleaning hoe outwardly extended from the annular member having a sharpened transverse edge substantially approximating the width of a tooth and adapted for tooth scraping purposes, and a longitudinally arcuate tooth cleaning sickle outwardly extended from the annular member having an outwardly disposed point adapted for picking and cleaning the teeth, the hoe and the sickle each having a concave finger engaging surface and said surfaces being disposed in a common direction circumferentially of the ring.

3. An instrument for use in cleaning teeth comprising an expansible annular band adapted to fit on a finger, a longitudinally curved hoe of substantially uniform width integrally attached to the band and extended outwardly of the band providing a concave transverse end edge bevelled to form a sharpened scraping blade, and a longitudinally curved sickle integrally attached to the band diametrically opposite from the hoe extended outwardly from the band and being tapered from the band outwardly to a sharpened point, the hoe and sickle being curved longitudinally in the same circumscribing direction about the band to provide alternately employable concave finger engaging surfaces.

4. A teeth cleaning tool adapted to be rotatably mounted on a user's finger and releasably held in alternate, opposite operating positions by engagement with an adjacent finger comprising an elongated metallic band having opposed end portions providing end edges and having opposed longitudinal edges, one of the end edges having a transverse contour adapted to fit the surface of a tooth and being sharpened to provide a tooth scraping blade, the end portion providing the scraping blade being arcuately outwardly return bent, the band being of annular form for rotatable reception on a user's finger with the end edge opposite to the scraping blade in adjacent spaced relation to the outwardly return bent portion thereof, a substantially triangularly shaped portion pierced from the band and bent arcuately outwardly from the band and slightly backwardly toward the band in the same circumscribing direction about the band as the return bend of the scraping blade, the outwardly return bent end portion of the band and the outwardly return bent triangular portion providing concave surfaces alternately engageable with the user's finger adjacent to that on which the ring is rotatably mounted to hold the opposite of said portions in operable position.

5. A dental instrument for use in oral prophylactic treatment comprising an elongated transversely arcuate metallic band having opposite longitudinal side edges, opposite end portions providing transverse end edges, and upper and lower surfaces, the end edge of one of the end portions being concave transversely of the band and being bevelled endwardly and upwardly from the lower surface to the upper surface, the bevelled end edge and the upper surface meeting in a concave knife edge for tooth scraping purposes, the end portion with the bevelled end edge being bent upwardly and slightly curved toward the upper surface of the bar thereby forming a tooth cleaning hoe adapted to clean both lingual and facial surfaces of the teeth and subgingival areas, a triangular portion cut out of the bar having a base integral with the bar, a sharpened apex point and being bent upwardly of the bar and curved in the same direction as the bent end portions, thereby forming a tooth cleaning sickle adapted to clean proximal and interproximal tooth areas, the bar being further bent into a ring adapted for rotatable mounting on a user's finger with the upper and lower surfaces of the bar forming, respectively, the outer and inner surfaces of the ring, with the end edge opposite from the bevelled end edge disposed in adjacent adjustable spaced relation to the lower surface of the bar at the bend between the formed ring and the hoe, with the hoe and sickle being positioned substantially diametrically of the ring, and with the hoe and the sickle providing surfaces disposed in a common direction circumferentially of the ring adapted for alternate engagement with a user's finger adjacent to that on which the ring is rotatably mounted, such finger engagement of the hoe and the sickle serving to maintain the other thereof in an outwardly disposed operable position.

6. A prophylactic dental tool comprising an annular body portion being peripherally interrupted for contraction and expansion adjustability and rotatable support on a user's finger, a hoe integral with the body portion adjacent to said interruption arcuately outwardly extended in a reverse curvature with respect to the annular body portion providing an endwardly disposed concave cutting edge, and a sickle integral with the body portion opposite thereto from the hoe arcuately outwardly extended in a reverse curvature with respect to the annular body portion in the same circumscribing direction about the body portion as the hoe, said sickle having a pointed extended end, the hoe and the sickle providing concave surfaces disposed in a common direction circumferentially of the annular body portion alternately engageable with a user's finger adjacent to that on which the body portion is mounted, such finger engagement of the hoe and sickle serving to retain the opposite thereof in operable position.

7. A prophylactic dental tool comprising a ring adapted for rotatable positioning on a user's finger, a hoe integral with the ring arcuately outwardly extended in a reverse curvature with respect to the ring providing an endwardly disposed concave cutting edge, and a sickle integral with the ring diametrically opposite to the hoe arcuately outwardly extended in a reverse curvature with respect to the ring in the same circumscribing direction about the ring as the hoe, said sickle having a pointed extended end, the hoe and the sickle providing concave surfaces disposed in a common direction circumferentially of the ring alternately engageable with the user's finger adjacent to that on which the ring is mounted and providing convex surfaces disposed in the opposite common direction circumferentially of the annular body portion alternately engageable with a user's thumb adjacent to the finger on which the ring is mounted, such finger and thumb engagement serving to control the position of the ring on the finger.

8. A prophylactic dental tool comprising an annular body portion adapted for rotatable support on a user's finger, a tooth engaging member arcuately outwardly extended in a reverse curvature with respect to the annular body portion providing a convex surface adapted for engagement with the user's thumb to preclude rotation of the ring in one direction about the user's finger, and an opposite member arcuately outwardly extended in a reverse curvature with respect to the annular body portion providing a concave surface adapted to engage the user's finger adjacent to that on which the ring is mounted to preclude rotation of the ring in the opposite direction.

References Cited in the file of this patent
UNITED STATES PATENTS 1,058,234     Hamilton _____ Apr. 8, 1913

OTHER REFERENCES

S. S. White: General Catalog of Dental Supplies, 1934, page 120. (Available in Division 55.)